Jan. 31, 1961 M. A. SULKIN ET AL 2,969,939
ASYMMETRICALLY VARIABLE SUPERSONIC INLET SYSTEM
Filed July 30, 1956 6 Sheets-Sheet 1

*INVENTORS*
MAURICE A. SULKIN
GORDON W. CAMPBELL
LOUIS C. YOUNG

BY

ATTORNEY

Jan. 31, 1961 M. A. SULKIN ET AL 2,969,939
ASYMMETRICALLY VARIABLE SUPERSONIC INLET SYSTEM
Filed July 30, 1956 6 Sheets-Sheet 5

FIG. 6

INVENTORS
MAURICE A. SULKIN
GORDON W. CAMPBELL
LOUIS C. YOUNG
BY

ATTORNEY

FIG. 8 — SYMMETRIC WEDGE NO YAW

FIG. 9 — SYMMETRIC WEDGE 4° YAW

FIG. 10 — ASYMMETRIC WEDGE 4° YAW

United States Patent Office 2,969,939
Patented Jan. 31, 1961

2,969,939
ASYMMETRICALLY VARIABLE SUPERSONIC INLET SYSTEM

Maurice A. Sulkin, Los Angeles, Gordon W. Campbell, Manhattan Beach, and Louis C. Young, Gardena, Calif., assignors to North American Aviation, Inc.

Filed July 30, 1956, Ser. No. 600,832

20 Claims. (Cl. 244—53)

This invention relates to a ram-air inlet and in particular relates to a supersonic engine-air inlet system that provides matching of the inlet-air supply and engine-air demand mass flow rates and which realizes a high inlet-pressure-recovery in all flight attitudes through the use of a normally symmetrical variable wedge compression surface in the inlet which can be asymmetrically varied to equalize the dynamic flow conditions on each side of the wedge during yawed flight conditions.

In turbo-jet and ram-jet engines the thrust available is a function of the weight rate of air flow to the engine. This weight rate of air flow to the engine is, in turn, a function of the total pressure of the air in the duct leading to the engine. Air cannot be decelerated from supersonic to subsonic speeds without passing through a flow discontinuity known as a shock wave with a resultant loss in total pressure. Thus for effective supersonic operation of turbo-jet and ram-jet engines it is important that the best possible total pressure recovery be achieved in the inlet of the engine duct. The magnitude of the total pressure loss is a function of the strength of the shock and varies from a minimum value for small pressure changes through an oblique shock wave to a maximum value for the case of the normal shock wave. Thus one or more oblique shock fronts may be created ahead of the normal shock front and the air velocity changed at these fronts from a higher to a lower supersonic velocity with a consequent improvement in the pressure recovery ratio; since the loss in total pressure through a normal compression shock wave as compared to the loss through an oblique shock wave is relatively high and increases with an increase in Mach number.

In order to create such a system of oblique shock waves preceding the normal shock wave existing at an air inlet moving at supersonic speed relative to the ambient air it is necessary to have a projecting sharp edge, wedge or ramp surface ahead of the inlet for initiation of such an oblique shock wave system. Additional oblique shock fronts may be set up at points of discontinuity along such a projecting surface rearwardly from the initial oblique shock front. The inlet total pressure recovery resulting from such an oblique and normal shock wave system is dependent on the inlet ramp angle, the flight Mach number and the effective angle of attack or yaw at the inlet.

Additionally, achievement of the maximum net propulsive effort of the power plant and good inlet stability require matching the air supply of the inlet to the air demand of the engine and accessories. The mass air flow supplied by a variable ramp type inlet is similarly a function of ramp angle, Mach number and effective angle of attack or yaw at the inlet. The engine-air mass flow demand is a function of the airflow characteristics of the particular engine, engine speed, ambient temperature and the air demand of accessory equipment using air bled from the inlet duct.

In order to obtain the maximum inlet pressure recovery consistent with minimum spillage drag and to insure inlet stability, a by-pass system is required in some engine installations. Such a system allows the excess air capacity of the inlet to be discharged from the inlet duct at sonic speed. Such an air-inlet system for achieving maximum pressure recovery of the inlet air and for matching the inlet air supply to engine air demand and reducing spillage drag is shown in a copending application entitled "Variable Supersonic Inlet and By-Pass System," Serial Number 595,287, by Louis C. Young, assigned to North American Aviation, Inc., the assignee of the present application.

A further additional and important requirement for stable flow into an engine when engine air is taken in through more than one inlet is that both inlet streams must diffuse to the same static pressure at their point of juncture. The mixing of two air streams with different energy levels can only be accomplished for a narrow range of total mass flows, therefore the stability range of a symmetric wedge inlet is very limited during yawed flight.

It is well known in the art to control oblique shock waves at generally cylindrical inlet ram-air diffusers by means of fixed or variable axially symmetrical spikes, needles, cones and the like in three-dimensional flow systems. However, an air inlet duct having one or more two-dimensional splitter wedges or ramps extending across and dividing the inlet into a number of separate inlets presents an entirely different problem by interfering with the requirement of stable flow into an engine when the inlet is in a yawed attitude, since the dynamic flow conditions at the separate inlets are not equal. When such an inlet having a vertical splitter wedge is in a yawed attitude, the effective compression angle on the leeward wedge surface is decreased by the amount of the angle of yaw while the effective angle of the windward surface is increased by a like amount. This lack of symmetry of the inlet due to yawing produces unequal dynamic flow conditions in the separate ducts. If the splitter wedge in the inlet is horizontal instead of vertical, a similar condition of unbalanced dynamic flow will exist in the separate ducts when the angle of attack of the wedge is other than zero.

Generally the present invention contemplates a supersonic air-inlet system for achieving the maximum net propulsive effort from an aircraft jet-type power plant utilizing an inlet-air by-pass mechanism for matching the inlet-air mass flow supply to the engine-air mass flow demand, a variable splitter ramp means for automatically achieving the optimum pressure recovery in the inlet air, and means for asymmetrically varying the variable ramp means in response to a yawed flight condition to produce substantially equal dynamic flow conditions on each side of the splitter ramp that are comparable to the dynamic flow conditions existing during unyawed flight.

Accordingly, it is an object of this invention to provide a supersonic ram-air inlet for controlling the position of the normal shock wave at the entrance to the inlet.

It is also an object of the present invention to provide a supersonic ram-air inlet wherein the optimum pressure recovery is achieved by a variable ramp movable in accordance with changes in Mach number.

It is another object of the present invention to provide adjacent supersonic ram-air inlets wherein the normal shock waves are predeterminately positioned at the inlets by a by-pass means in accordance with changes in the static pressure in the inlet for effecting optimum matching of inlet-air mass flow supply and engine-air mass flow demand.

It is a further object of this invention to provide a variable wedge in a supersonic inlet for initiating and controlling an oblique and normal shock wave system for efficient pressure recovery of the air.

It is still a further object of this invention to provide a variable wedge in a supersonic duct inlet capable of asymmetric variation and responsive to a yawed flight attitude to substantially equalize the dynamic flow conditions on each side of the wedge.

Still a further object of the invention is to provide a plurality of supersonic duct inlets having independently adjustable compression surfaces therein responsive to a yawed attitude of the inlets relative to the initial airstream for equalizing the Mach number and pressure recovery ratio in each inlet.

These and other objects and advantages of the present invention will become apparent to those skilled in the art after reading the present specification and the accompanying drawings forming a part thereof, in which.

Figure 2:
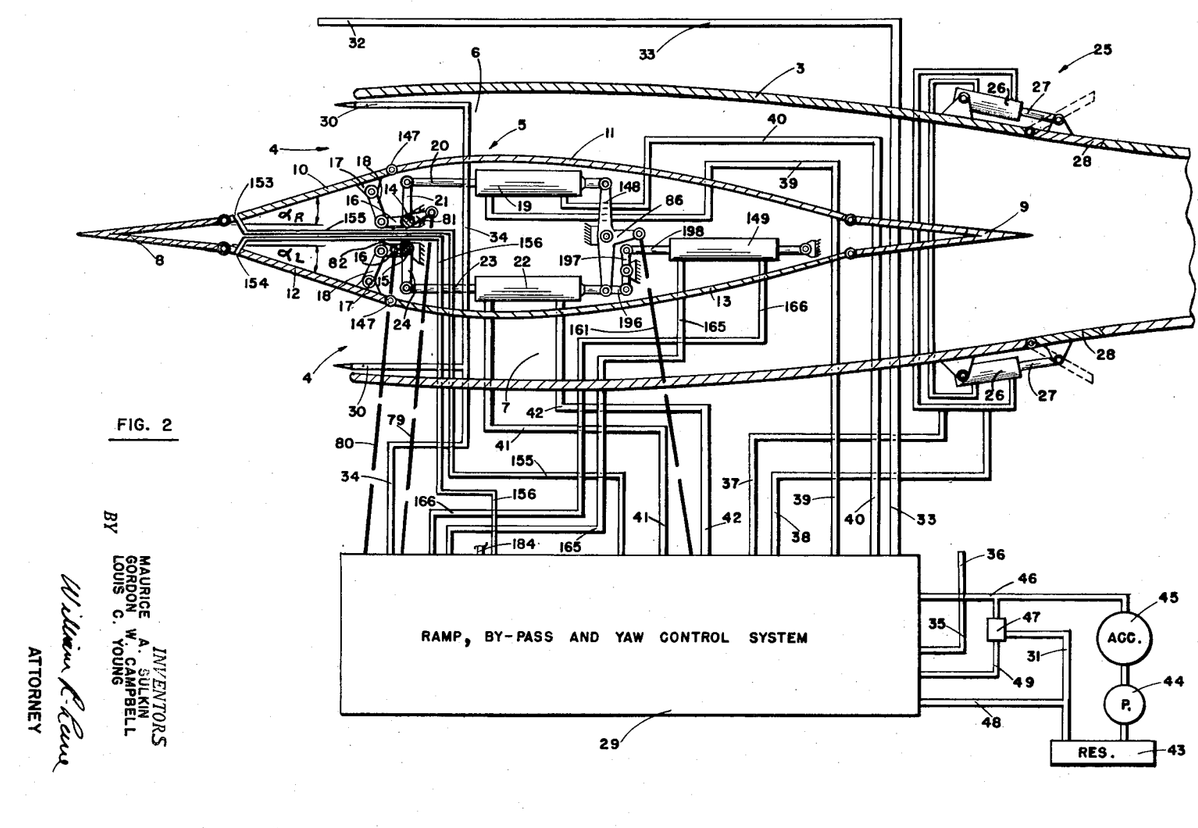
Fig. 2 is a diagrammatic plan view, partly in section, of the inlet duct of a first embodiment of this invention showing the variable ramps, by-pass doors and the actuating mechanism therefor.

Referring specifically to the drawings, wherein like reference characters have been used throughout the several views to designate like parts, and referring at first to the embodiment of Fig. 2, reference numeral 3 generally designates a combustion air intake duct or conduit for a turbo-jet powered missile or aircraft 1, which extends generally rearwardly from a frontal air inlet 4 to the engine. While the power plant herein is designated as being of the turbo-jet type, the invention has equally important applications to ram-jet power systems wherein a high pressure-recovery ratio is of fundamental importance to successful operation, the by-pass system can be controlled to match the inlet-air supply and engine-air demand to prevent flow instability and to give efficient engine operation, and the asymmetric wedge produces substantially equal dynamic flow conditions in the separate ducts.

Figure 8:
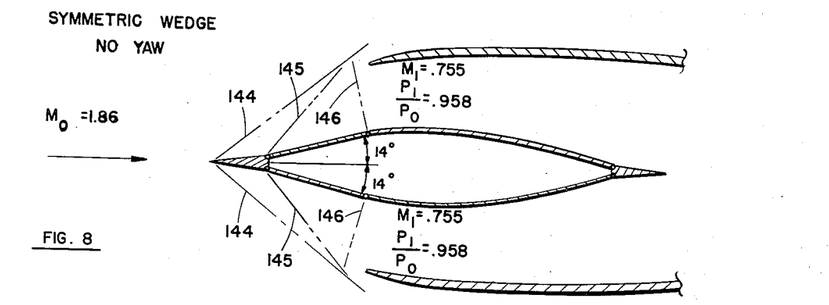
Fig. 8 is a diagrammatic view of the variable wedge showing the equality of Mach numbers and pressure recovery ratios in the opposite right and left ducts for a specified flight Mach number in an unyawed condition with a symmetrical wedge.
Figure 9:
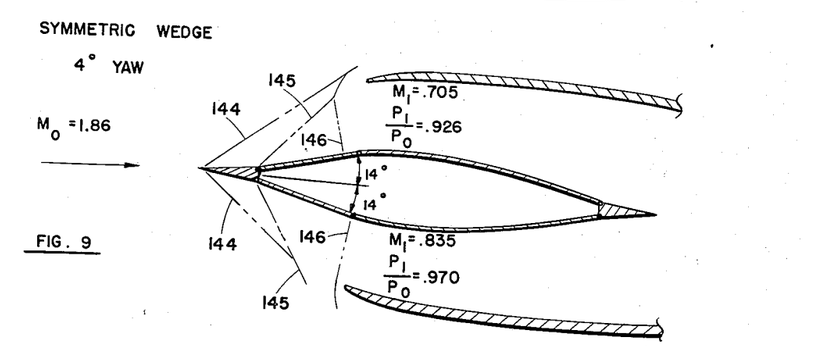
Fig. 9 is a diagrammatic view of the variable wedge showing the unequal Mach numbers and pressure recovery ratios existing in the right and left ducts when the inlet is in a yawed flight condition with the wedge maintained symmetrical.
Figure 10:
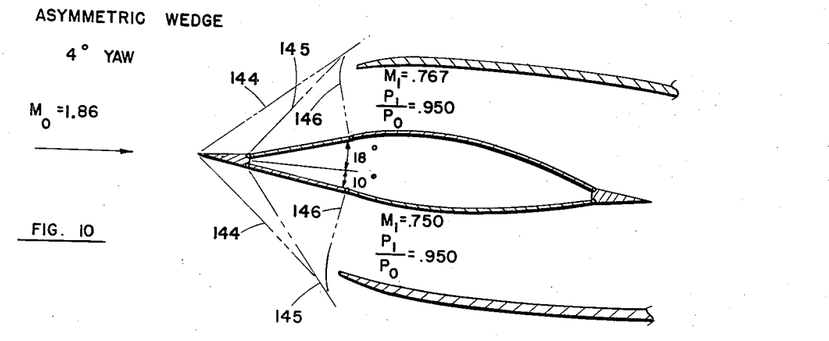
Fig. 10 is a diagrammatic view of the variable wedge showing the manner in which the Mach number and pressure ratio in the right and left ducts are maintained substantially equal during yawed flight by asymmetrical variation of the wedge ramps.

Due to the high loss in total pressure occurring across a normal shock wave when a high Mach number supersonic airflow is slowed to subsonic flow, it is desirable to first slow the supersonic flow to a lower Mach number by means of a supersonic diffuser before passing it through the normal shock front. This can best be accomplished for a two-dimensional type inlet by the introduction of a pointed or sharp-edged wedge-like body into the airstream for creating one or more oblique shock waves ahead of the normal shock wave at the entrance to the inlet whereby the airflow will be slowed to a lower Mach number. Accordingly, a splitter wedge 5 is provided centrally in the conduit 3 for creating an initial oblique shock wave 144. Figs. 8–10 show the location of the shock waves on the structure of the embodiment of Fig. 2. Wedge 5 extends the full height of the conduit and divides it into a symmetrical right hand duct 6 and left hand duct 7 in the forward portion of conduit 3.

Wedge 5 is comprised of a fixed diverging forward wedge portion 8 having a total enclosed angle of approximately 12° projecting a predetermined distance ahead of the inlet and a converging rearward wedge portion 9 positioned a spaced longitudinal distance aft of wedge portion 8. Intermediately located between the hinged rearward edge of forward wedge portion 8 and the hinged forward edge of rear wedge portion 9, on the right side, are two movable right ramp portions 10 and 11. Forward movable ramp portion 10 is hinge-connected to wedge portion 8 at the front end and to the front edge of the rearward movable ramp portion 11 at the other end. Ramp portion 11 in turn is hingedly connected to rear wedge portion 9. Movable ramp portions 12 and 13 are similarly hinge-connected to form the left side of wedge 5. Movable ramps 10, 11, and 12, 13 comprise compression surfaces that can be moved laterally inwardly or outwardly to form, with the fixed walls of conduit 3, a variable throat area in each of the separate ducts 6 and 7. The movable ramps 10 and 12 in the illustrated embodiment have a total enclosed angle varying between the limits of 6.5 degrees when retracted and 44 degrees when fully extended. The exact degree of angularity required is a matter of design based on the particular characteristics and functions required of a particular installation. By suitable manipulation of ramps 10 and 12, in conformance with variations in Mach number of the aircraft, the wedge angle of the ramps may be changed to vary the inlet throat area and the oblique shock angles to achieve optimum total pressure recovery. The forward ends of rearward ramps 11 and 13 follow the movements of the forward ramps 10 and 12, to which they are attached, and with the walls of conduit 3 the rearward portions of ramps 11 and 13 form generally diverging subsonic diffuser sections in the separate ducts 6 and 7.

The hinge 147 joining ramp 10 to ramp 11 and ramp 12 to ramp 13 is of a type permitting free lateral movement of the ends of the ramps in a manner to allow controlling the inlet duct throat area while maintaining a substantially smooth uninterrupted boundary surface.

In normal operation movable forward ramps 10 and 12 diverge angularly outwardly from the divergent sides of fixed nose wedge 8. This line of juncture discontinuity creates a second oblique compression shock wave 145 of the "corner" type behind the initial oblique shock front created at the front of nose wedge 8. The strength of this second oblique shock front is a function of the variable relative angle between the movable forward ramps 10 and 12 and the diverging surfaces of fixed wedge 8 and it increases in strength with an increase in divergence of the movable ramps 10 and 12, or as the deflection angle between the adjoining surfaces increases. Thus, one of the primary purposes of splitter wedge 5 is a lowering of the airstream Mach number to a point close to but still greater than Mach 1 in order to reduce the strength of the normal shock wave 146 and minimize pressure losses through the normal shock front.

Located within the splitter wedge are two vertically positioned ramp actuating shafts 14 and 15, for operation of the right and left ramps respectively. Shafts 14 and 15 are suitably supported and journaled for limited rotational movement about their vertical longitudinal axes and have one or more rigidly mounted crank arms 16, each for connection to a bracket 17 fixedly mounted on the inner surfaces of one of the movable ramp portions 10 and 12 by a pin-connected link 18. Upon rotation, shaft 14 moves right ramp 10 laterally in or out about its forward hinged end through crank 16 and link 18. Shaft 15 similarly operates left ramp 12 but the ramp connecting linkage is positioned to operate ramp 12 180 degrees out of phase with ramp 10 when shafts 14 and 15 are both rotated in the same direction. Therefore to produce equal movement of the movable ramps in opposite directions, shafts 14 and 15 must be rotated in opposite directions at the same time to produce simultaneous symmetrical narrowing or expansion of the throats of the separate ducts 6 and 7. Right shaft 14 is actuated by a double-acting hydraulic actuator 19 which is pivotally attached at one end to a centrally pivoted yoke arm 148 and has a reciprocable piston therein. Piston rod 20, rigidly attached to the actuator piston at one end, is pin-connected at the other end to crank 21 which is rigidly attached to the lower end of shaft 14. Left shaft 15 is similarly actuated by a double-acting hydraulic actuator 22 having a reciprocable piston rod 23 pin-connected to a crank 24 which is rigidly attached to the lower end of shaft 15. The left ramp actuator 22 is pivotally attached to the other end of yoke arm 148.

A yaw actuator 149 is pivotally attached at one end to rigid supporting structure of the aircraft. Piston rod 198 connects to one end of yoke 148 either directly or through intermediate linkage, such as push rod 196 and lever 197, as shown. Operation of the yaw actuator in a direction to extend piston rod 198 causes pivotal movement of yoke arm 148 about its central axis and causes a longitudinal displacement in a forward direction of one of the two ramp actuators while the other ramp actuator will be longitudinally displaced rearwardly an equal amount. Retraction of the piston rod causes longitudinal movement of the right and left actuators in a reverse manner. It will be seen that the ramp actuators operate independently of the yaw actuator; and since the ramp actuators normally operate in unison, longitudinal displacement of the ramp actuators will result in imparting an asymmetric configuration to the variable ramps by decreasing the angle $\alpha$ of one ramp and increasing the angle $\alpha$ of the other ramp.

In the device as disclosed herein, the air inlet is located on an upper surface of the supporting aircraft structure and the lower end of each of shafts 14 and 15 are extended into such supporting structure for connection to the actuating cylinders which are pivotally mounted on stationary supporting structure within the fuselage or missile body below conduit 3. Other portions of the control system, to be described below, are also conveniently positioned in such supporting structure. It is obvious, however, that the air intake structure of this invention is not limited to the exact installation shown or described herein. Such an installation is equally adaptable for suspension from a body such as a fuselage or wing. Various other arrangements of the linkage and operating device can also obviously be utilized to effectively actuate the ramps, other than the specific mechanism described herein.

An air by-pass mechanism forms an integral part of the present system for controlling the inlet air to achieve optimum operating conditions. In order to eliminate drag due to the spillage of air around the edges of the inlet duct, which occurs under certain low mass flow conditions, all of the air within the "capture area" of the inlet must be able to enter the duct. If the engine-air mass flow demand rate is less than the inlet-air mass flow supply rate at any particular instant, the normal shock wave will be detached ahead of the inlet and spillage of the excess air around the edges of the inlet will take place at supersonic speeds with a resultant increase in drag. At low mass flow rates a condition of inlet instability may occur wherein the inlet-air mass flow and the normal shock location oscillate rapidly in the inlet conduit. Such inlet instability can create a resonance condition in the air duct that may damage or destroy portions of the aircraft or engine, such as compressor blades and the like. Thus the purpose of the by-pass control mechanism is to provide efficient inlet-engine matching so as to reduce spillage drag to a minimum and achieve the maximum net propulsive effort of the engine and also to provide a means for insuring stability of the air inlet system. In view of the wide range of possible inlet mass flow ratios and possible variations in engine-air demand, an engine by-pass system is very desirable for achieving optimum dynamic flow conditions. While normally very little by-pass area will be required at design angles of attack, rapid changes in aircraft attitude or engine-air demand will induce inlet instability if no provisions are made for by-passing the excess air supplied by the inlet. This by-pass device controls the air mass flow rate in the duct to the engine by providing a door or flap means for bleeding the excess air capacity of the inlet from the conduit 3 at a point intermediate the inlet and the engine and discharging it overboard at sonic speed or utilizing it for auxiliary purposes.

As shown in Fig. 2, the by-pass actuating mechanism 25 comprises a plurality of double-acting cylinders 26 having reciprocable pistons and piston rods 27 pivotally connected to discharge doors or flaps 28 located in the wall of conduit 3. Doors 28 are hinged for pivotal movement to open upon retraction of the piston rods 27 into the cylinders, thereby establishing communication between the interior of conduit 3 and the ambient atmosphere to allow discharge of the excess inlet air. Fig. 2 also shows in broken line outline the position these by-pass doors would take upon opening.

The control system for the variable ramps and by-pass doors, as illustrated and described in this embodiment, comprises a mechanical-hydraulic device operable in response to changes in the inlet flow conditions as sensed by pneumatic probe means. The control system is generally indicated in Fig. 2 by reference numeral 29.

Figure 1:
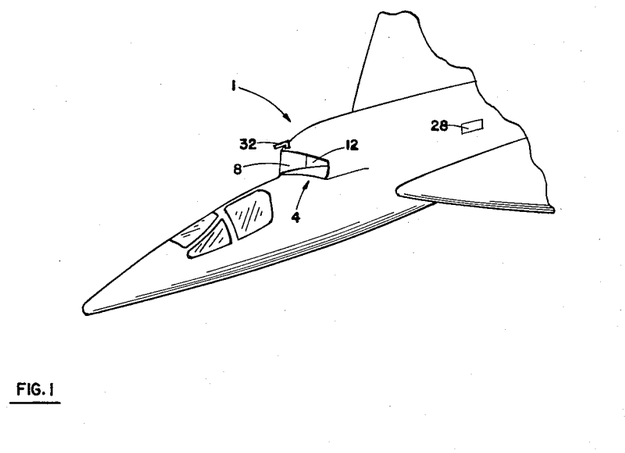
Fig. 1 is a partial perspective view of an airplane incorporating the asymmetrically variable wedge and by-pass system of this invention.

The angles $\alpha_R$ and $\alpha_L$ of the variable right and left ramps are individually adjustable in response to a change in Mach number as measured by the ratio of the free-stream total pressure, measured behind a normal shock wave by the airspeed boom 32 to the ambient static pressure measured by a tube 36. The ramp angles are adjusted in unison to maintain a substantially constant ratio of such total pressure to static pressure, and the total included ramp angle for a given Mach number is a constant. As shown in Fig. 1, the total pressure is measured by an airspeed boom or pilot tube 32 projecting forwardly of the upper edge of fixed forward wedge 8.

The by-pass portion of control system 29 senses a shock pressure due to the normal shock wave by means of static pressure sensing tubes at two or more predetermined points in the inlet and adjusts the by-pass airflow to maintain the normal shock 146 between the same two points, which are located at the limits of the desired range of normal shock travel. These pressure pickup points, as shown, are located on the cowl at 30 as in the embodiment of Fig. 2 but may be suitably positioned elsewhere in the inlet. Instead of using separate static pressure pickup points on different sides of the normal shock front, for the cowl type probe or rake, it has been found to be advantageous in some installations to use a slotted probe extending through the shock front whereby an automatic pressure integration across the shock wave is obtained. If the strength of the normal shock is constant, the sensed shock pressure is a function of the position of the normal shock front relative to the pressure pickup points.

The yaw portion of control system 29 senses the static pressure in the right and left ducts. Under yawed conditions of flight the resulting pressure differential between the right and left ducts causes the yaw actuator 149 to asymmetrically adjust ramps 10 and 12 to produce substantially equal dynamic and static flow conditions in the ducts comparable to similar flow conditions during unyawed flight with symmetrical wedge conditions. As shown in the Fig. 2 embodiment, the static pressure is measured on the surface of ramps 10 and 12 by static pressure tubes 153 and 154, respectively, relatively near the hinged forward end thereof. These tubes or taps are behind the two oblique shock waves but normally are ahead of the normal shock wave.

As further shown in Fig. 2, in addition to the pneumatic sensing conduits 33, 34, and 35 which communicate with the control system 29 from total pressure probe 32, shock sensing probe 30, and ambient static pressure pickup 36 respectively, conduits 155 and 156 communicate the right and left ramp static pressures from taps 153 and 154 respectively to control system 29. Conduits 39, 40 and 41, 42 provide communication between the right and left ramp actuating cylinders 19 and 22, respectively, and control system 29 for the supply and return of working fluid to and from the double-acting hydraulic cylinders. Similarly, hydraulic operating fluid is alternatively supplied to one end and returned from the other end of each of the by-pass actuator cylinders 26 by conduits 37 and 38, while yaw actuator 149 is similarly served by hydraulic conduits 165 and 166.

Hydraulic fluid is supplied to system 29 by a conventional closed hydraulic system comprising in series hydraulic return line 48, reservoir 43, pump 44, accumulator 45, high pressure conduit line 46, pressure regulator 47 for reducing a portion of the high pressure hydraulic fluid to a lower working pressure, conduit 49 supplying the low pressure hydraulic fluid to the control system and pressure regulator by-pass and return line 31.

Figure 3:
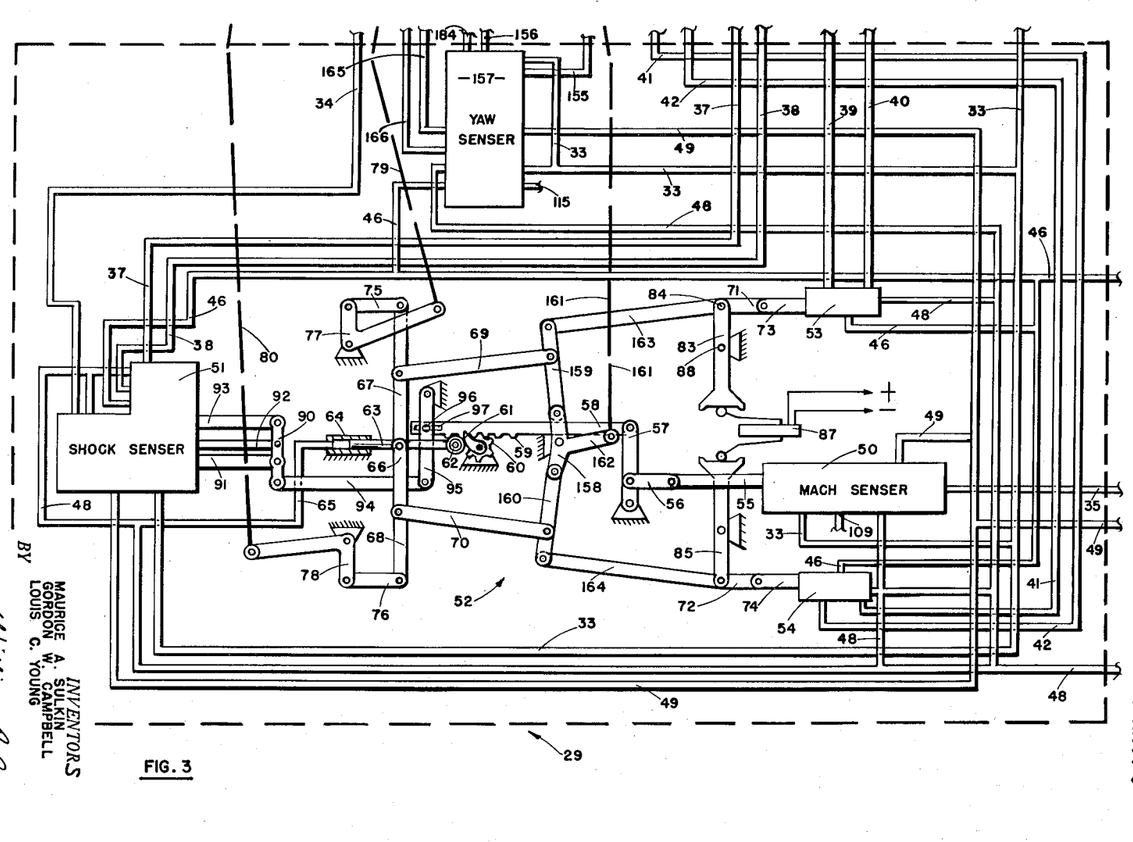
Fig. 3 is a diagrammatic view of the control system for the variable ramps and by-pass doors including a Mach senser, a shock senser, a yaw senser, and an articulated linkage system.

Control system 29 is shown in detail in Fig. 3. It comprises generally a Mach senser unit 50 for controlling the ramp positions in accordance with the ratio of airstream total pressure to static pressure on the ramps, a shock senser unit 51 for controlling the positioning of the by-pass flaps, a yaw senser unit 157 for controlling the asymmetric variation of the ramp angles $\alpha_R$ and $\alpha_L$ of wedge 5, and an articulated pin-connected linkage system 52 operated by the Mach senser output shaft for actuating the right and left ramp actuator valves 53 and 54, respectively, and includes feedback or followup connections to the ramp actuating shaft 14 and 15 and the yaw actuator yoke arm 148.

More specifically, Mach senser output shaft 55 is longitudinally reciprocable in a linear relationship with respect to the aircraft Mach number as felt by Mach senser 50. Shaft 55 is connected to an intermediate point on pivotally movable crank arm 57 through intermediate link 56. Rack arm 58 is pivotally connected at the outer end of crank 57 and movable in response to movement of output shaft 55. A toothed rack 59 comprising a portion of rack arm 58 meshes with a suitably supported pinion 60 and causes it to rotate in response to movement of the rack 59. Rigidly mounted on the same shaft as pinion 60 and rotatable therewith is cam 61. The surface of cam 61 has a configuration predeterminately designed to give a particular ramp angle for a particular value of Mach number in order to achieve the optimum pressure recovery at the inlet at any given speed. Cam follower 62 bears against the surface of cam 61 and moves follower rod 63, on which it is mounted, in a longitudinal direction in response to the cam movement. The rear end of follower rod 63 is reciprocally mounted in pressurized cylinder 64 to assure positive contact between follower 62 and the cam surface. Hydraulic pressure is applied to the cylinder by conduit 65 which communicates with hydraulic return line 48.

Motion of follower rod 63 is transmitted through lever 67 and push rod 69 to a lever 159 which has its inner end pin-connected to one end of a three-armed centrally pivoted whiffle-tree 158. The outer end of lever 159 is pivotally connected to push rod 163 and through intermediate link 71 to the right ramp valve stem 73. The motion of rod 63 is similarly transmitted through lever 68, push rod 70, lever 160, push rod 164 and intermediate link 72 to the left ramp actuator valve stem 74. All members of the linkage system are pin-connected for free pivotal movement and are symmetrical about follower rod 63 so that right and left valve stems 73, 74 are simultaneously and equally actuated by the Mach senser unit in response to a change in the flight Mach value. The ramp actuator valves may be of any suitable quick-acting type, such as a spool valve, wherein pressurized hydraulic fluid may be directed to either end of the double-acting ramp actuating cylinders 19, 22 through one or the other of their associated pairs of conduits 39, 40 and 41, 42, respectively, with the alternate conduit of each pair being used as a return line. Preferably this working fluid is at a pressure of 3000 p.s.i. To provide an indication of when the ramps are fully closed or fully extended a warning light system may be provided. In this system a lever 83 is pin-connected at one end to the ends of push rod 163 and link 71 by pin 84 and fulcrumed at 88 for pivotal movement about that point. The other end of lever 83 has a track or surface with sloping end limits or cam surfaces at each end of the track. A roller on the end of an arm of a suitable double throw switch 87, such as a microswitch which is normally energized only when closed, contacts the track and rides thereon. When push rod 163 is moved, switch lever 83 rotates about fulcrum 88, and when the amount of travel is sufficient to cause the switch roller to contact and ride up on either of the end limit cam surfaces, the switch is closed and a circuit may be completed to provide a visual or audible warning when the ramp is either in its innermost or outermost limit positions. Similarly, when left push rod 164 is moved substantially longitudinally fore-and-aft, lever 85 is caused to move about fulcrum 89; and when left ramps 12 and 13 are at their most extended or retracted position, the roller on the second arm of double-throw switch 87 will be raised by the end ramps or cams on the outer end of lever 85 into a position to complete a circuit and light a warning light on the pilot's instrument panel.

The ends of levers 67 and 68 are pin-connected to the ends of links 75 and 76 respectively and the latter links have their other ends pin-connected to right and left bell cranks 77 and 78 respectively. Connected to the other arm of the right bell crank is a rigid ramp-feedback or follow-up rod 79 which connects to a crank 81 rigidly mounted on the right ramp actuator shaft 14. A similar feedback rod 80 connects bell crank 78 with a crank 82 fixedly mounted on the left actuator shaft 15. A lever arm 86 extending from yoke arm 148 is connected to a third arm 162 on whiffle-tree 158 by rigid yaw-feedback rod 161.

The ramp feedback system repositions the ramp actuator valves to a neutral position after the ramp has taken the angle called for by the cam 61 in response to the flight Mach number at any given instant. In this neutral position the hydraulic supply and return lines are closed and the actuating cylinders are thereby effectively locked in position against movement. The yaw-feedback system modifies the action of the ramp feedback system under yawed flight conditions to take into account the asymmetric relationship of the ramps and ramp actuators and alters the linkage system by means of whiffle-tree 158 to prevent overcontrolling of the system.

Shock senser unit 51 includes a lever 90 which is pivotally connected to the shock senser output shaft 91, servo shaft 92, and feedback shaft 93. One end of lever 90 is pivotally connected to a push rod 94 which has its other end connected to an end of crank 95. Intermediate the ends of crank 95, a guide pin 96 is constrained to move within a slot 97 in the outer end of rack arm 58. Movement of lever 90 is thus limited by the amount of movement permitted guide pin 96 in slot 97. By proper dimensioning of the linkage and slot system the shock senser unit 51 may be rendered inoperative below a predetermined minimum Mach number below which it may not be desirable to operate the by-pass flaps.

Figure 4:
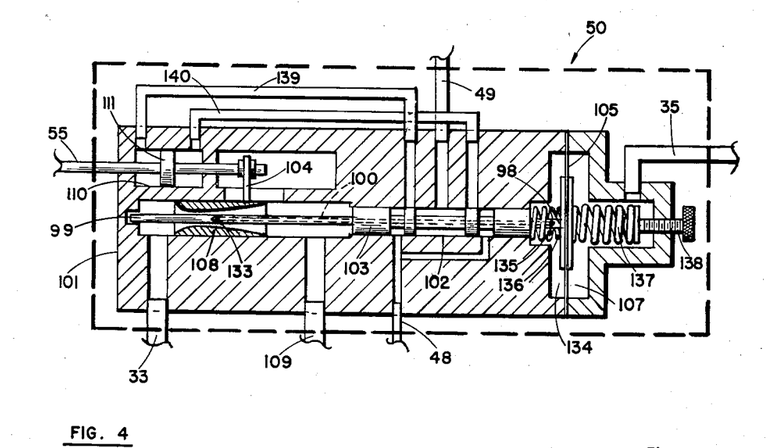
Fig. 4 is a sectional view of a diagrammatic representation of the Mach senser unit.

The Mach senser unit performs the function of controlling the flow of hydraulic fluid to the left and right ramp actuating cylinders and is not a part of the invention per se. As schematically illustrated in Fig. 4, the unit comprises a block 101 having a bore 102 with a spool type valve 103 slidably positioned therein. A cavity at one end of block 101 is divided into two chambers 107, 134 by a flexible diaphragm 105 which is fixedly connected to valve spool 103 by valve stem extension 98. The diaphragm is spring loaded on each side by means of the coil compression springs 136 and 137 which are initially adjustably stressed the proper amount by means of thumbscrew 138. Outer chamber 107 is in communication with the ambient static pressure by means of conduit 35 and pressure pickup 36. At the other end of the valve spool a venturi 108 is slidably positioned in bore 102. Total pressure conduit 33 communicates with bore 102 upstream of the venturi, and the air carried thereby flows through the venturi and is discharged through exhaust conduit 109. Rod 99, axially concentric with valve spool 103, extends from the left end of the valve spool axially through the throat of venturi 108. A passageway 100 extends axially through this rod from a connecting port 133 located in the surface of the rod within the venturi at a location downstream of the venturi throat. Passageway 100 also extends axially through the spool valve and into extension 98 where it communicates with chamber 134 through a port 135. The static pressure existing in the venturi at port 133 is thus communicated to chamber 134. This static pressure varies with the flow rate and the distance of port 133 from the throat of the venturi. The differential pressure created by this static pressure at port 133 acting on one side of the diaphragm 105 in chamber 134 and by the ambient static pressure acting on the other side of the diaphragm in chamber 107 causes movement of the valve spool in a manner to establish communication between pressurized hydraulic fluid conduit 49 and one of the two hydraulic conduits 139, 140 leading to and from the senser unit power cylinder 110; while the other one of the two conduits 139, 140 is placed in communication with return line 48. The hydraulic fluid for operating the senser units of the control system is preferably at a pressure of 500 pounds per square inch. Double acting piston 111 is reciprocable in cylinder 110 in response to the hydraulic pressure to drive output shaft 55 in a direction dependent on whether the Mach number of the aircraft is increasing or decreasing. Venturi 108 is rigidly attached to one end of output shaft 55 by pin 104 and is slidably repositioned by the movement of the output shaft to a new position in a manner to equalize the pressures on each side of diaphragm 105 and move spool valve 103 back to its initial neutral position wherein the hydraulic supply and return lines are blocked off by the valve spool lands. This followup system provides for step adjustment of the ramps in accordance with a change in Mach number and a return to neutral of the sensing device when the required ramp angle is achieved.

Figure 5:
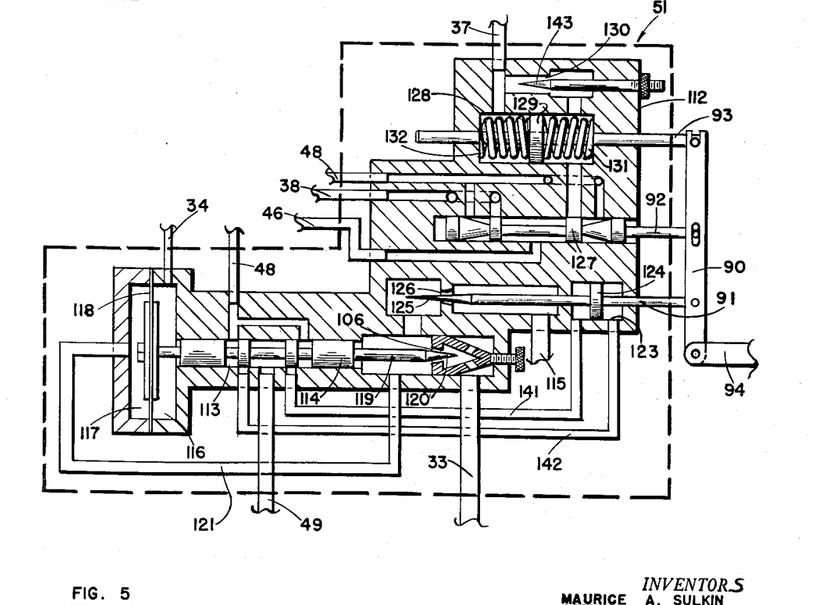
Fig. 5 is a sectional view of a diagrammatic representation of the shock senser unit.

The shock senser and computer unit 51 performs the function of metering hydraulic fluid to the by-pass flap opening cylinders 26 in accordance with the pressure difference between the total pressure behind a normal shock as measured at a remote point and a shock pressure as measured across the inlet normal shock front. The shock pressure is measured by means of a probe or rake having two or more pressure pickup taps spaced across the shock front and communicating with the flow in a manner to sense the static pressure through the shock front. The shock pressure then will reflect the average of the individual pressures at the separate pickups and will give an indication of the position of the normal shock wave, since the shock pressure will change if the normal shock front moves forwardly or rearwardly from its normal predetermined position between the outer pickup points. A slotted probe may also be used to measure the pressure across the shock front to give a more accurate integration of the static pressures across the normal shock wave. The shock senser forms no part of this invention per se, and as schematically illustrated in Fig. 5, the unit comprises a block 112 having a bore 113 with a spool type valve 114 therein. A cavity at one end of block 112 is divided into two chambers 116 and 117 by a flexible diaphragm 118 which is fixedly connected to the valve spool 114. At the other end of bore 113 a valve stem extension 119 has a needle valve portion 120 on the end thereof controlling an adjustable calibrated orifice 106 which meters the total-pressure air taken in by the total-pressure pickup 32 and conducted to the control system by conduit 33. This total pressure is communicated to chamber 117 by conduit 121 while chamber 116 communicates with the shock pressure pickup probe 30 through conduit 34. Any pressure differential existing across the diaphragm causes the diaphragm and attached spool valve to be displaced, thereby admitting pressurized hydraulic fluid to one end or the other of power cylinder 123 through conduit 141 or 142, depending on the direction of movement of the diaphragm and attached valve spool. A piston 124 is reciprocable in cylinder 123 in response to the hydraulic pressure to move output shaft 91. One end of shaft 91 is pin-connected to lever 90 while the other end forms a needle valve 125 for controlling the bleeding of the total-pressure air to atmosphere at 115 through a second calibrated orifice 126 in response to the position of the power piston 124. Orifices 106 and 126 are calibrated to provide a fixed ratio of the airstream total pressure to the shock pressure. At this ratio valve spool 114 is in a neutral position preventing movement of piston 124 in the power cylinder 123. When this ratio is varied by a change in the shock pressure due to displacement of the normal shock, valve spool 114 is displaced and piston 124 actuated. Movement of output shaft 91 repositions needle valve 125 relative to orifice 126 in a manner to oppose the change from the design pressure differential and thereby acts to reposition valve spool 114 in its neutral position closing the hydraulic supply and return ports. The control action is thus by a series of successive steps with successive changes in shock pressure.

The movement of output shaft 91 is transmitted through lever 90 to servo shaft 92 which operates a servo valve 127 of the spool type for controlling the admission and return of pressurized hydraulic fluid to and from the by-pass actuator cylinder 26 through conduits 37 and 38. Conduit 37 includes a chamber 128 with a piston 129 slidable therein and rigidly connected to feedback shaft 93 which shaft in turn is pin-connected to lever 90. Piston 129 is normally centered in chamber 128 by two similar opposed springs 131 and 132, one acting on each side of the piston. An orifice-type by-pass 130 adjustably controlled by needle valve 143 interconnects the opposite ends of chamber 128.

When servo valve 127 admits pressurized hydraulic fluid into one end of chamber 128, the additional pressure forces the spring-loaded piston 129 toward the opposite end of the chamber, thereby pressurizing the fluid trapped between the opposite side of piston 129 and the pistons in by-pass actuator cylinders 26, thereby moving the pistons to open the by-pass doors. Upon return of servo 127 to the neutral position, the hydraulic pressure supply and return lines are closed off and the pressure on opposite sides of piston 129 becomes equalized through by-pass orifice 130, and the piston is returned to its central neutral position by the springs, thus returning shaft 93 and the connected end of lever 90 to their initial starting position. If servo valve 127 is moved in an opposite direction, pressurized fluid will be supplied through conduit 38 to cylinders 26 to close the by-pass doors. The fluid trapped between piston 129 and the by-pass actuator pistons acts to move the piston 129 and shaft 93 toward the right until the pressure becomes equalized through the by-pass orifice 130 when the piston and shaft will be returned to a neutral central position.

Figure 6:
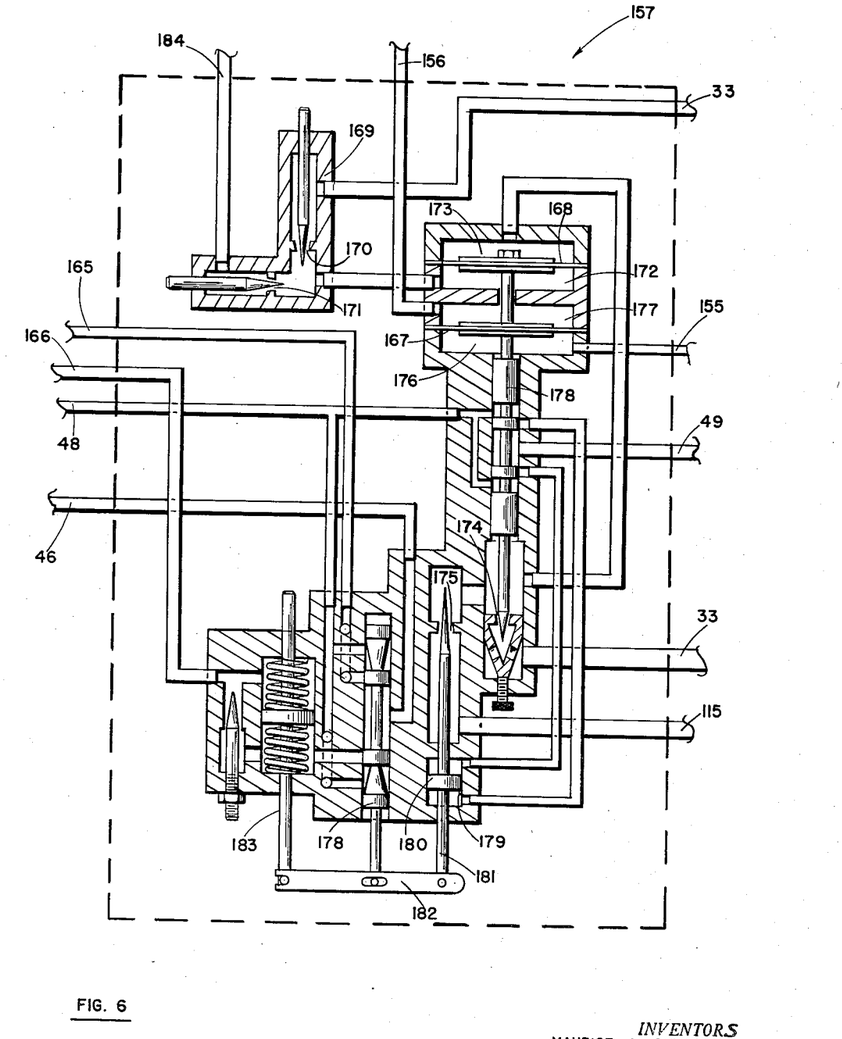
Fig. 6 is a sectional view of a diagrammatic representation of the yaw senser unit.

Yaw senser unit 157 meters hydraulic fluid to the yaw actuator 149 in accordance with the pressure differential existing between the right and left ramp static pressures. The senser unit froms no part of this invention per se, and as schematically illustrated in Fig. 6, the unit is essentially similar to the shock senser mechanism. The yaw senser differs from the shock senser by the addition of a second flexible diaphragm 168 and a total pressure throttling unit 169 comprising adjustable orifices 170 and 171 bleeding to the ambient atmosphere through conduit 184 for balancing the pressure in chamber 172 on one side of diaphragm 168 against the total pressure in chamber 173 on the other side of diaphragm 168 as metered through orifices 174 and 175 as in the shock senser unit. First diaphragm 167 forms a flexible wall dividing chambers 176 and 177. The right ramp static pressure is communicated to chamber 176 through conduit 155 and the left ramp static pressure is communicated to chamber 177 through conduit 156. Diaphragms 167 and 168 are rigidly connected to valve spool 178. The static pressure differential existing between the ramps when in a yawed attitude creates a differential force on diaphragm 167 which causes valve spool 178 to shift longitudinally in response to the diaphragm movement. Movement of the valve spool admits pressurized hydraulic fluid to one end or the other of power cylinder 179, depending on the direction of movement of the diaphragm and attached valve spool. Piston 180 is reciprocable in cylinder 179 in response to the hydraulic pressure to move output shaft 181. Shaft 181 is pin-connected at its outer end to lever 182. Movement of lever 182 causes axial movement of servo valve 178 in a manner to connect the high pressure hydraulic supply 46 to one of conduits 165 or 166 while the other conduit is connected to return line 48. Movement of the servo valve in an opposite direction causes a reversal of these connections with a consequent reversal in direction of motion of the double-acting yaw actuator piston. The yaw senser unit includes an adjustable orifice feedback unit 183 connected to the lower end of lever 182 for returning the lower end of lever 182 to its original position, as in the shock senser unit above.

Figures 7, 11:
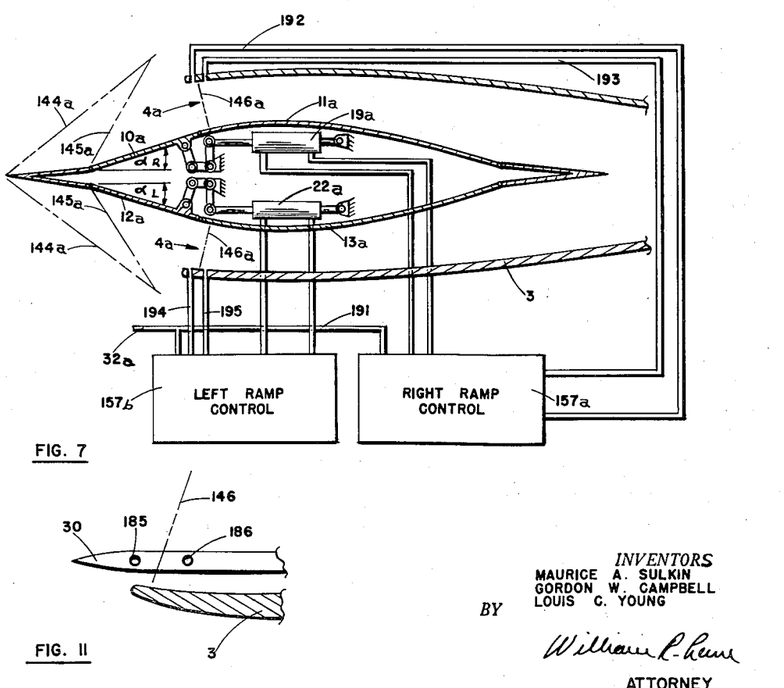
Fig. 7 is a diagrammatic view of a second embodiment of this invention showing a different method of controlling the variable ramps.
Fig. 11 is a diagrammatic view, on an enlarged scale, of one of the shock sensing probes of Fig. 2 located at the intake cowl and showing the normal shock wave located in its normal controlled position between the two static pressure sensing taps.

Fig. 7 schematically illustrates another embodiment of the invention showing a method for individually controlling the ramps by means of the position of the normal shock wave. An inlet-air by-pass system is not shown for sake of clarity, but could be readily incorporated into the system in a manner similar to the first embodiment of Fig. 2.

A rake or probe with static pressure tubes 192 and 193 is located on the right side of the conduit inlet 4a on the cowl center line for measurement of the pressures in front of and behind the normal shock front. A similar probe with tubes 194 and 195 is located on the left side of the inlet. Right ramp actuator 19a and left ramp actuator 22a are connected to the right and left ramps respectively by shaft linkage systems as described in the embodiment of Fig. 2.

The free stream total pressure behind a normal shock is measured at an undisturbed remote point by a probe 32a and communicated to the individual ramp control systems 157a and 157b through conduit 191. In this embodiment the control systems 157a and 157b can be comprised of a hydraulic unit identical to yaw senser unit 157 of the first embodiment. Such a unit would be adjusted by means of the needle-valve orifices to be in a neutral position when the normal shock wave is positioned between pressure tubes 192 and 193. In this position the right ramp actuator would be immobilized since the pressure supply and return are closed off by the servo valve portion of the hydraulic unit 157a. If the flight Mach number, inlet attitude, or engine-air demand change so as to increase the inlet-air mass flow ratio and move the normal shock forward of tube 192, the static pressures $P'_A$ and $P'_B$, at tubes 192 and 193 respectively, will be approximately equal and will be greater than the remote total pressure $P'_T$, the control system will increase the ramp angle $\alpha_R$ until the normal shock in the right duct is relocated between tubes 192 and 193. If the normal shock is swallowed into the inlet, the pressures $P'_A$ and $P'_B$ will be approximately equal and less than total pressure $P'_T$ and the control system 157a will decrease ramp angle $\alpha_R$ until the normal shock is positioned between tubes 192 and 193. Left variable ramp 12a would be operated independently by an identical duplicate control system 157b. Consequently the stability range of the inlets is increased under flight conditions which tend to change the relative ramp surface angles with respect to the initial air stream direction, since the ramp surfaces are positioned independently to insure optimum inlet performance on each side of the wedge.

Instead of using the pressure differential across the normal shock wave as measured by tubes 192 and 193, a slotted probe may be used for giving an integrated shock pressure. For this type of probe the control mechanism could consist of the hydraulic shock senser unit of the first embodiment.

The control system could also consist of suitable electrical circuitry operated by make and break contacts in response to movement of pressure responsive diaphragm. Such a system should preferably incorporate a "jog" or "pecking" circuit to accomplish the ramp angle changes in small increments. The rate of ramp angle increase should be several times the rate of decrease of the ramp angle, so that in the event of a cycling or hunting signal, which may be generated by the onset of inlet instability known as "buzz" which is the rapid oscillation of inlet mass flow and normal shock location, the control will jog the ramp to a greater angle and eliminate the instability.

Control of boundary layer air is important to efficient operation of the inlet systems of this invention not only from the standpoint of drag reduction but also in order to obtain true readings of static pressure on the ramp. For this reason the ramps should have a boundary layer air bleed-off system (not shown) comprising ramp surfaces having a suitable porosity and an eduction means for continuously removing the boundary layer air. It is particularly important that pressure tubes 153 and 154 be located in a region of high ramp porosity to insure against pressure "feedback" through the boundary layer.

Figs. 8 to 10 are schematic illustrations of the results of wind tunnel tests of an inlet model having a projecting vertical wedge compression surface in conformance with the present invention as previously described. Fig. 8 shows the inlet shock geometry during operation with a 14 degree variable ramp angle at a free stream Mach number ($M_0$) of 1.86 and the inlet in line with the initial flow direction; i.e., unyawed. The test figures on the illustration show that uniform flow conditions exist on both sides of the wedge with equal post-shock-wave Mach numbers ($M_1$) and equal ratios of the total pressure ($P_1$) behind the shock system to the total pressure ($P_0$) ahead of the shock system.

Fig. 9 shows that when the inlet is yawed 4 degrees the effective compression angle on the windward variable ramp is increased 4 degrees while the effective angle on the leeward variable ramp is decreased by the same amount. The figure shows that the Mach number $M_1$ behind the shock system and the pressure recovery through the shock system $P_1/P_0$ are not the same on both sides of the wedge.

Fig. 10 shows the effect of wedge asymmetry during yawed flight. The ramp angle on the windward side is reduced and the ramp angle on the leeward side is increased in proportion to the yaw angle. The figure shows that the inlet flow conditions are substantially the same between the two inlets and experimental data prove that the stable operating range of the asymmetric inlet in yaw is comparable to the performance of the symmetric inlet in unyawed flight.

From the description it will be seen that this invention provides a unique two-dimensional supersonic ram-air inlet system that enables a jet-type engine to efficiently realize its maximum propulsive effort at any particular set of air inlet conditions. This is accomplished by automatic proportioning of the inlet-air mass flow between the engine and a by-pass device, so that spillage drag at the inlet will be minimized or eliminated, by achieving the maximum possible pressure recovery from the supersonic airstream by means of a wedge having a variable ramp compression surface, and by asymmetric variation of the ramps about a medial plane to achieve substantially equal static and dynamic flow conditions in each inlet under all flight attitudes. The mass air flow supplied by a variable ramp type inlet and the amount of pressure recovery attained thereby are interrelated and are both functions of the flight Mach number, the ramp angle, and the effective angle of attack of the inlet. With the ramp angle adjusted in conformance with a given inlet attitude and Mach number to produce the optimum pressure recovery in the inlet supersonic diffuser, the inlet-air mass flow rate may under certain operating conditions be capable of supplying more air than the engine can use. If this air is not diverted in some manner, the normal shock front may move out in front of the inlet and become detached from the lip of the inlet. This will cause a spilling over around the edges of the inlet lip of some of the air that would otherwise have entered the duct and may upset the aerodynamic stability of the inlet. This spillage at supersonic speeds will cause an increase in drag. The by-pass mechanism allows substantially all of the air within the capture areas of the inlet to enter the duct by positioning the normal shock wave within the entrance of the inlet and causes the excess air to be discharged overboard downstream of the inlet so as to stabilize and match the inlet-engine mass air flows at the optimum ramp angle for achieving maximum pressure recovery.

Additionally, the inlet system of the present invention provides for mixing of the air streams in the two inlet ducts at substantially equal static pressures under all conditions of flight. Asymmetric variation of the wedge in response to yawing of the aircraft enables the dynamic flow conditions in each of the wedge-separated inlet ducts to be maintained substantially equal, thus allowing joining of the two air streams without excessive mixing energy losses.

In this manner the system of this invention supplies the correct amount of air required by the engine for efficient operation and achieves the optimum pressure recovery under all attitudes of the inlet while assisting the propulsive effort of the engine by reducing the inlet spillage drag.

While particular embodiments of this invention have been illustrated and described herein, it will be apparent that various other changes and modifications may be made in the construction and arrangement of the various parts without departing from the spirit and scope of this invention in its broader aspects or as defined in the following claims.

We claim:

1. In a supersonic airborne vehicle of the type having a propulsive engine and a plurality of air inlets connected to the engine with by-pass means for automatically discharging the inlet-air excess over the engine-air demand and variable ramp means comprising independently operable ramps in each inlet for automatically obtaining the optimum pressure recovery in the inlet air; the combination with said inlet of a means for sensing the dynamic flow conditions in said inlets, and means responsive to said sensing means for asymmetrically varying said variable ramp means by adjusting the ramps in each inlet whereby the dynamic flow conditions in the separate air inlets are equalized when the vehicle is in a yawed flight attitude relative to the initial air stream direction.

2. In combination with a supersonic vehicle having a propulsive engine and ram-air inlets angularly disposed to the air stream direction connected to the engine for supplying air to the same, means for sensing the aerodynamic conditions in the inlets; a first means responsive to said sensing means for discharging the excess air capacity of the inlet; a second means responsive to said sensing means for obtaining optimum pressure recovery of the inlet air; and a third means responsive to said sensing means for for equalizing the dynamic flow conditions in said angularly disposed inlets, said third means comprising at least one individually movable, laterally variable ramp in each inlet; and means for simultaneously moving the ramp in each of said inlets in the same direction for asymmetrically deforming said inlets.

3. In combination with a supersonic airborne vehicle having a propulsive engine and a plurality of ram-air inlets connected to the engine for supplying air thereto and having an oblique and normal shock wave system at each inlet; means for sensing a change in flight Mach number; means responsive to said Mach sensing means for maintaining optimum pressure recovery in the inlet air; means for sensing the static pressure increase across the inlet normal shock waves; a first means responsive to said normal shock wave sensing means for discharging the excess air of the inlet at sonic velocity; and a second means responsive to said normal shock wave sensing means for equalizing dynamic flow conditions in each of said inlets, said second means comprising multiple ramps independently movable relative to each other.

4. In a supersonic aircraft of the type having a propulsive engine connected to a ram-air inlet by a conduit with a wedge means having separate, independently operable ramps thereon dividing the inlet and conduit into a plurality of separate inlets and ducts and with a by-pass means in the conduit for automatically discharging the excess air taken in by the inlet over the air required by the engine and with means for automatically varying the wedge means for obtaining optimum pressure recovery in the inlet air; the combination with said separate inlets of a means for sensing the static pressure therein; and means responsive to said sensing means for asymmetrically varying said wedge means by simultaneously moving said separate, independently operable ramps in the same direction whereby the dynamic flow conditions in the separate inlets and ducts are substantially equalized when the aircraft is in a yawed flight attitude.

5. In a supersonic aircraft having a propulsive engine connected to a ram-air inlet by a conduit with a variable wedge means therein having laterally expansible side members that are normally symmetrical during unyawed flight and which divides the inlet into a plurality of separate inlets and having a by-pass means in the conduit for automatically discharging the inlet air excessive over engine air demand and with means for automatically varying the wedge means for obtaining optimum pressure recovery in the inlet air through the oblique and normal shock wave system incident on the wedge means; the combination with said separate inlets of means for sensing the position of the normal shock wave relative to each separate inlet; and means responsive to said sensing means for automatically varying said side members to impart an asymmetric configuration to said variable wedge means during yawed flight whereby the normal shock wave at each separate inlet is predeterminately positioned relative to each of said separate inlets and dynamic flow conditions in the separate ducts are equalized during such yawed flight.

6. In a supersonic airborne vehicle having a conduit with a ram-air inlet, a wedge means dividing said conduit into a plurality of ducts; said wedge means including a movable member in each duct, means for sensing the differential static pressure between said ducts; and means responsive to said sensing means for predeterminately asymmetrically positioning said laterally movable members to position the normal shock wave at said inlet in a manner to substantially equalize the dynamic flow conditions in the separate ducts when the vehicle is in a yawed attitude and the ram-air inlet is not normal to the airstream.

7. In a supersonic aircraft having an engine air inlet and attached duct, a wedge projecting from said inlet and having laterally movable compression surfaces for creating oblique and normal shock waves for effecting controlled pressure recovery in the inlet air, means for sensing the static pressure at the inlet, and means responsive to said sensing means for moving said compression surfaces laterally to asymmetrically vary said wedge configuration for controlling the location of the shock waves at the air inlet and for substantially equalizing dynamic flow conditions in the inlet on each side of the wedge during yawed flight.

8. In a supersonic aircraft having an engine air inlet and a conduit leading therefrom to the engine, a centrally positioned wedge means projecting forwardly from said inlet for creating a system of oblique and normal shock waves for effecting pressure recovery of the inlet air, said wedge means forming with said conduit symmetrical ducts, said wedge having a separately adjustable surface in each duct for controlling the position of the normal shock wave at the entrance to each of said ducts, means at the lip of each duct for sensing the location of the normal shock wave at the entrance of each duct, and means for coordinately positioning each of said separately adjustable surfaces in response to said sensing means for positioning said shock waves to produce substantially uniform dynamic flow conditions in each of said ducts.

9. A supersonic fluid inlet having an opening defined by a leading edge, a streamlined normally symmetric member protruding upstream of said inlet edge and extending aft of said opening, said streamlined member including a plurality of variable means capable of lateral extension, and means for moving said variable means for asymmetrically deforming said streamlined member.

10. In a supersonic airborne vehicle having a conduit with a fluid inlet, a wedge means dividing said conduit into a plurality of ducts, said wedge means having at least one variable ramp member in each duct, and means for independently moving said ramp members to asymmetrically deform said wedge means.

11. In a supersonic vehicle having a conduit with a fluid inlet defined by a leading edge, a streamlined deformable member dividing said conduit into a plurality of ducts, said member including at least one individually laterally movable element in each of said ducts to vary the cross section thereof, means for sensing the aerodynamic conditions at said inlet, and means responsive to said sensing means for simultaneously varying said individually laterally movable elements in the same direction to asymmetrically deform said deformable member in a manner to substantially equalize the dynamic flow conditions in each of said ducts by substantially maintaining said deformable member at a zero angle of attack relative to the air stream.

12. In a supersonic vehicle in a yawed flight attitude having a conduit with a fluid inlet defined by a leading edge, wedge means dividing said conduit into a plurality of ducts, said wedge means including at least one laterally movable surface in each duct, means for sensing the pressure differential existing between said ducts, and means responsive to said sensing means for moving at least one of said surfaces laterally inwardly and another of said surfaces laterally outwardly to asymmetrically deform said wedge means in a manner to substantially equalize the dynamic flow conditions in each of said ducts.

13. A supersonic diffuser for an airborne vehicle comprising a conduit having an opening defined by a leading edge, a wedge member dividing said conduit into separate ducts, said wedge member having laterally movable articulated ramps on each side, means for sensing the aerodynamic conditions at said inlet, means responsive to said sensing means to operatively move said ramps laterally outwardly and inwardly to simultaneously change the throat dimensions of the separate ducts in the same manner to achieve optimum pressure recovery in the separate ducts, and means responsive to said sensing means for further operatively moving said ramps laterally to asymmetrically deform said wedge member in a manner to substantially equalize the dynamic flow conditions in each of said ducts when said inlet is angularly disposed relative to the airstream.

14. A supersonic fluid intake comprising a conduit having a fluid inlet defined by a leading edge, an articulated wedge member dividing said conduit into a plurality of ducts and having laterally movable ramp surfaces, and means for effecting independent coordinated lateral movement of said surfaces in response to varying inlet aerodynamic conditions to substantially equalize the dynamic flow conditions in each of said ducts when the fluid intake is angularly disposed relative to the airstream.

15. A supersonic diffuser for an airborne vehicle comprising a conduit having an opening defined by a leading edge, a wedge member dividing said conduit into separate ducts, said wedge member having laterally movable articulated ramps on each side, means for sensing the aerodynamic conditions at said inlet, means responsive to said sensing means for symmetrically expanding and contracting the ramps of said articulated wedge to achieve optimum pressure recovery in said separate ducts, and means responsive to said sensing means for moving said ramps to asymmetrically deform said articulated wedge to substantially equalize the dynamic flow conditions in each of said ducts when the inlet is angularly disposed relative to the airstream.

16. In a supersonic vehicle having an air inlet, the combination of a plurality of separate independently movable ramp means for controlling and obtaining optimum pressure recovery of the inlet air, said ramp means dividing the inlet into a plurality of individual ducts; means for sensing the dynamic flow conditions in said ducts; and means responsive to said sensing means for asymmetrically moving the independently positionable ramp means in the ducts to substantially equalize the dynamic flow conditions in the individual ducts when the vehicle air inlet is disposed other than normal relative to the airstream.

17. In a supersonic fluid inlet having an opening defined by a leading edge, a streamlined member protruding upstream of the leading edge and extending aft within said opening, said streamlined member having movable ramp surfaces thereon; and means for decreasing the angle of the windward ramp relative to the medial plane of said streamline member and for increasing the angle of the leeward ramp relative to the streamlined member medial plane when the streamlined member is angularly positioned relative to the airflow whereby substantially equal pressure recovery may be achieved on each side of the streamlined member.

18. In a supersonic fluid inlet having an opening defined by a leading edge, a streamlined wedge member protruding upstream of said leading edge and extending aft within said opening, said member having ramp surfaces independently pivotally mounted thereon; and means for decreasing the compression angle of the windward ramp surface and increasing the compression angle of the leeward ramp surface when the angle of incidence of the airstream on said wedge member is other than zero whereby substantially equal pressure recovery may be achieved on each side of the wedge member.

19. In combination with a supersonic airborne vehicle having a propulsive engine and a plurality of ram air inlets connected to the engine for supplying air thereto and having an oblique and normal shock wave system at each inlet; means for sensing a change in flight Mach number; means responsive to said Mach sensing means for maintaining optimum pressure recovery in the inlet air; means for sensing the static pressure increase across the inlet normal shock wave; and a means responsive to said normal shock wave sensing means for equalizing dynamic flow conditions in each of said inlets, said equalizing means comprising multiple individually operable ramps coordinately movable relative to each other.

20. In a supersonic fluid inlet having an opening defined by a leading edge, wedge means having a plurality of independently movable, angularly positionable ramp means thereon dividing said inlet into a plurality of individual ducts; means for sensing the dynamic airflow conditions; a first means responsive to said sensing means for independently moving at least one of said ramp means to vary the throat area of at least one of said ducts for effecting optimum pressure recovery of the inlet air in said duct; and a second means responsive to said sensing means for simultaneously and coordinately moving said plurality of ramp means in the same direction for asymmetrically deforming said wedge means when the latter is angularly positioned relative to the airflow whereby susbtantially equal pressure recovery may be achieved in each of said ducts.

References Cited in the file of this patent

UNITED STATES PATENTS

| | | |
|---|---|---|
| 2,638,738 | Salter | May 19, 1953 |
| 2,776,806 | Brendal | Jan. 8, 1957 |
| 2,840,322 | Griffith | June 24, 1958 |

FOREIGN PATENTS

| | | |
|---|---|---|
| 614,548 | Great Britain | Dec. 17, 1948 |